UNITED STATES PATENT OFFICE.

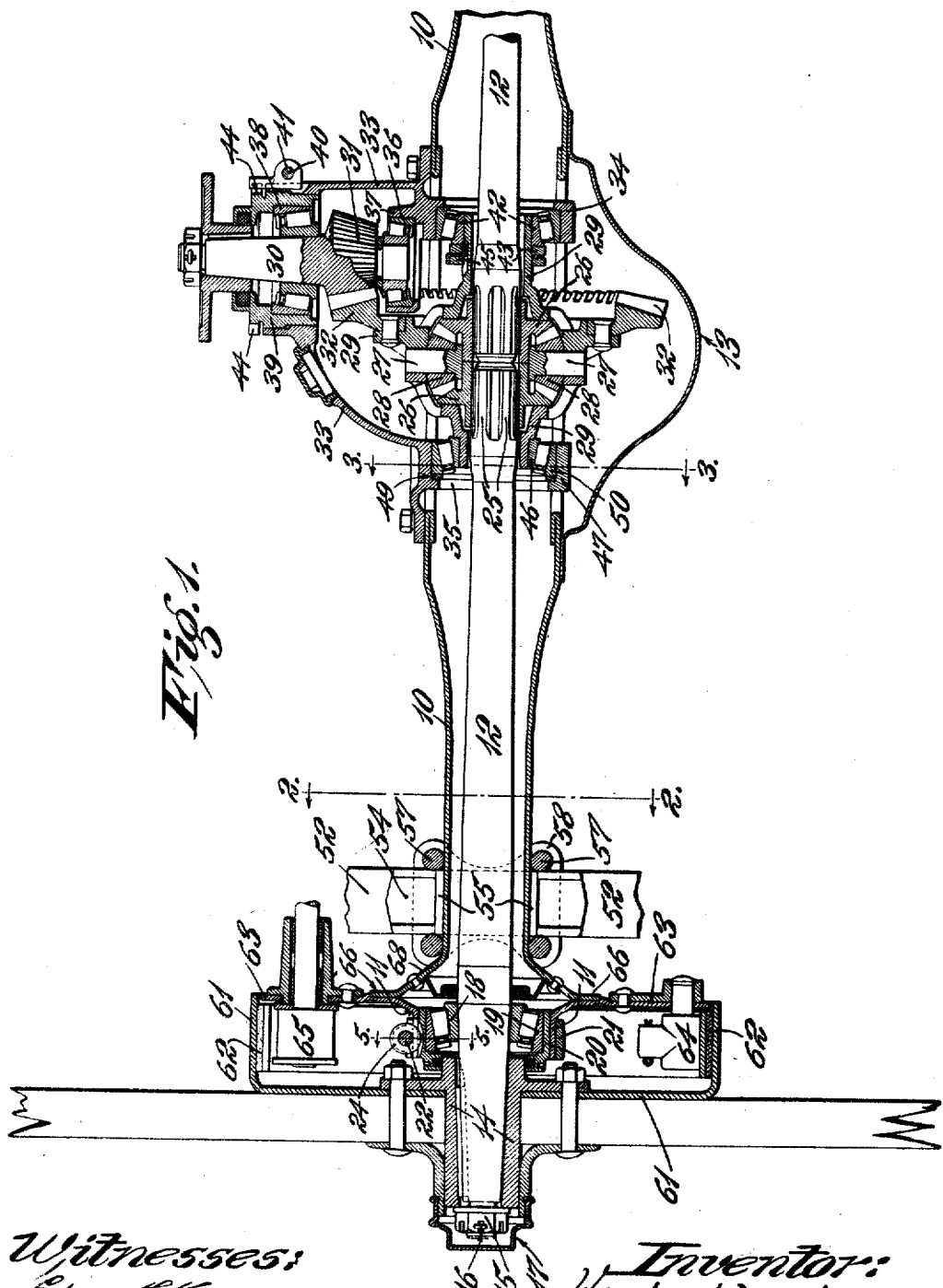

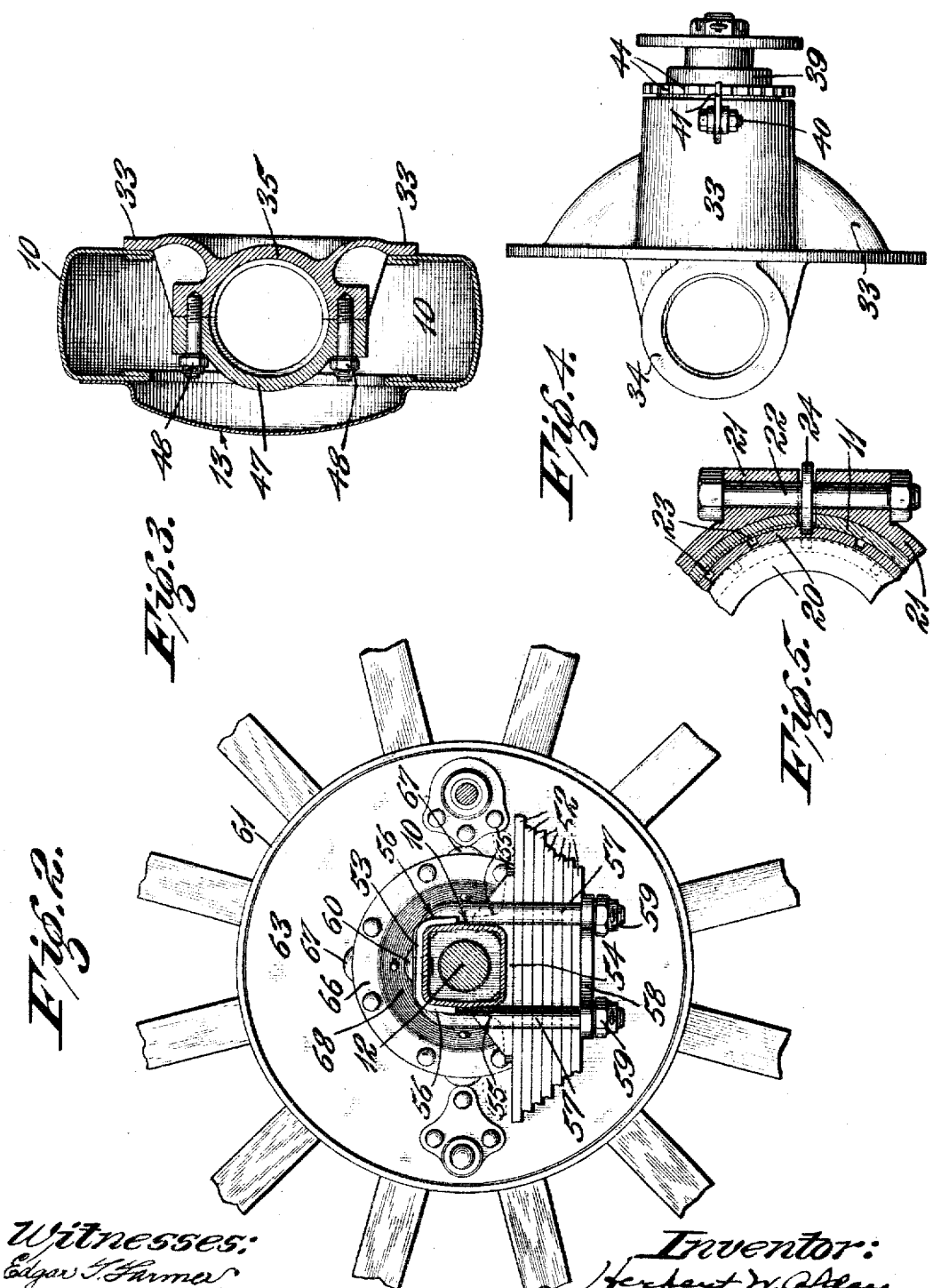

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

MOTOR-VEHICLE AXLE.

1,241,893.  Specification of Letters Patent.  Patented Oct. 2, 1917.

Application filed February 6, 1915. Serial No. 6,481.

*To all whom it may concern:*

Be it known that I, HERBERT W. ALDEN, a citizen of the United States, and a resident of the city of Detroit, county of Wayne and State of Michigan, have invented a new and useful Improvement in Motor-Vehicle Axles, of which the following is a specification.

This invention relates to hollow driving axles for motor vehicles, and particularly to the arrangement of the driving parts for gear driven live driving axles.

One of the objects of this invention is a simple and compact arrangement of the driving gear and shafts, and bearings therefor, such that few parts are required, and the assembling and proper adjustment of the parts is easily performed.

Another object of the invention is a mounting for the bevel driving gears and differential gear and their bearings which permits of ready inspection and removal of the gears and adjustment of the bearings, and which can be accurately and cheaply made, which is rigid, and which cannot easily get out of adjustment.

The invention consists in housing the driving parts in a light weight hollow axle casing having a middle portion which is adapted to receive a differential gear carrier which rotatably supports the inner ends of the driving axles, and end portions having adjustable bearings for the outer ends of the driving axles, whereby either said gear carrier or said driving axles may be adjusted independently. The invention also consists in a carrier member for the driving gears of strong, light construction which can be accurately made and which is not liable to get out of adjustment. The invention further consists in the construction and arrangement of parts shown in the accompanying drawings, which illustrate a preferred form of the invention. What the invention comprises is particularized in the appended claims.

In the drawings, in which the same reference characters designate like parts in the several views, Figure 1 is a horizontal section of a portion of an axle embodying the invention;

Fig. 2 is a cross-section on the line 2—2 in Fig. 1, looking in the direction of the arrows, the saddle and spring being shown in side view;

Fig. 3 is a cross-section of the casing, carrier frame and pedestal, on the line 3—3 in Fig. 1, looking in the direction of the arrows;

Fig. 4 is a side elevation of a gear carrier, the split pedestal cap being removed; and Fig. 5 is a detail sectional view on the line 5—5 in Fig. 1, looking in the direction of the arrows, showing the clamping and locking means of the holders for the bearings at the outer ends of the driving axles.

The driving axle shown in the drawings is rotatably mounted in a substantially rectangular axle casing or housing 10, which has tubular extensions 11 at its ends within which are journaled the outer ends of the axle sections 12. The hollow axle casing 10 is enlarged at the middle to form a chamber for the bevel driving gears and differential gearing, to which access may be had through an opening in the side of the casing which is closed by a removable cover 13. The inner ends of the axle sections abut, and are supported in their respective parts of the differential gearing for rotation thereby. The outer ends of the driving axle sections 12 project through the tubular ends of the axle housing, and carry the road wheels of the vehicle. The hubs 14 of the road wheels are keyed on the tapered ends of the axle sections, and are held on by nuts 15, which are provided with slots through which fit radial pins 16 which pass through transverse holes in the outer ends of the driving axles. The ends of the driving axle sections are covered, and the pins 16 are held in place, by the hub caps 17, which screw on the hubs over the outer ends of the driving axle sections. The outer end of each axle section 12 is rotatably supported in a combined radial and thrust antifriction bearing comprising tapered rollers arranged between conical bearing race-ways. The inner race-way or cone 18 is pressed on the tapered end of the axle section ahead of the wheel hub. The outer race-way or ring 19 is secured in an adjustable cup member 20 which is threaded on its exterior, and which is screwed into the threaded end of the tubular extension 11 of the axle housing 10. The threaded end of the tubular extension 11 is split longitudinally along one side, and a split clamping ring 21 is clamped around it by a bolt 22 to bind it around the threaded cup 20 and hold the latter in adjusted position. The cup has a series of longitudinal grooves 23 spaced around its periphery, and a washer 24, which is held between the ends of the split clamping ring 21 by the clamping bolt, projects into one of the grooves 23 and locks the cup in adjusted position. The arrangement of the conical race ways is such that outward thrust on the wheel and driving axle is resisted by the outer bearing ring and the axle section is thereby prevented from being withdrawn from the housing. The inward thrust is resisted by the opposite driving axle section. By removing the wheel and hub from the end of the driving axle, the locking means for the cup 20 are exposed, and the latter can be unscrewed from the tubular support 11, thereby enabling the driving axle to be withdrawn from the housing.

The inner ends of the driving axle sections are provided with ribs or teeth 25 which slidably engage in the grooved hubs of the two oppositely disposed bevel gears 26 of the differential gear. The bevel gears 26 are journaled in the spider 27 which carries the small bevel pinions 28 of the differential gear, all of which parts are mounted in the differential gear drum 29.

The differential gear drum is rotated from the propeller shaft 30 by means of a bevel pinion 31 on the propeller shaft which meshes with a bevel gear 32 secured to a flange which encircles the drum. The propeller shaft is journaled in bearings which are mounted in a gear carrier 33 which is bolted to one side of the axle casing, and the hubs of the differential gear drum are journaled in two pedestals 34, 35 which project from the gear carrier 33 into the axle housing in axial alinement with the wheel hubs. Tapered roller bearings of an adjustable type such as are shown in my Patent No. 921,656, for example, are used for mounting both the propeller shaft and the differential drum. The bearing ring 36 for the inner end of the propeller shaft is mounted in a solid pedestal 37 which is an integral part of the gear carrier, and the ring 38 for the opposite bearing is mounted in an adjustable sleeve 39 which screws into the gear carrier to take up the wear in the propeller shaft bearings. The side wall of the gear carrier is split in from the end which carries the sleeve 39, and the latter can be locked in adjusted position by a clamping bolt 40 and detent 41. The detent has a finger which engages in one of a series of notches 44 in the periphery of the flanged end of the sleeve, and is held in engagement therewith by the bolt 40. The bearing 42 on the hub of the differential drum next to the large bevel driving gear is adjustable lengthwise on the hub to take up wear in the bearings for the drum. It is held in proper position by means of an adjusting ring nut 43 and lock nut 45. The other bearing 46 for the differential drum is not adjustable on the hub.

The pedestal 34 on the side of the differential gear drum next to the large bevel driving gear is solid. The opposite pedestal 35 is split in a vertical plane (as shown in Fig. 3), and is provided with a removable cap 47 for the bearing 46. This cap is held in place by stud bolts and nuts 48. A spacing washer 49 is inserted between the pedestal 35 and the ring or outer race member 50 of the bearing 46. Upon withdrawal of the driving axles 12 from engagement with the hubs of the gears 26, and the removal of the cap 47 and spacing washer 49, the bearing 46 and drum can be shifted endwise away from the opposite pedestal 34 in order to permit of the disassembling of the drum and bearings and their removal as a unit from the carrier 33.

No provision is made for holding the axle casing from rotating other than the springs, which must resist the driving and braking torque, or forces tending to rotate the axle casing produced by the driving and braking devices. The axle casing 10 is preferably of approximately square shape near its ends, having flat top and bottom walls, and having side walls which have a slight outward slant from the upper and lower corners to the middle horizontal plane of the axle. The springs 52 preferably are suspended below the axle by means of a U-shaped hanger 53, as shown in Fig. 2. The upper leaf of the spring is seated against a saddle 54, which has two lugs or arms 55 embracing the adjacent portions of the side walls of the axle and slanting outward to conform thereto. The side walls 56 of the hanger also slant outward to conform to the slant of the adjacent portions of the side walls of the axle. The hanger bolts 57, four in number depend from the side walls 56 of the hanger near its ends on both sides of the axle, and embrace the spring and saddle between them. The spring rests on a plate 58, having holes in its four corners through which the hanger bolts pass, and the parts are all tightly clamped together by screwing up the nuts 59 hard against the under side of the plate. Suitable means is provided for locking the nuts in place. A stud 60, which is riveted or otherwise secured to the hanger, fits in a hole in the top wall of the axle and positions the parts lengthwise of the axle.

The road wheels are each provided with a brake drum 61 which is secured on the inside of the spokes, and which is adapted to be engaged by a friction band 62 arranged therein. The brake band 62 is supported on an annular disk 63 which is secured on the end of the axle casing 10, and is held from rotating with the wheel by means of an anchor arm 64 carried by the disk. As shown in the drawings, the annular disk 63 is a portion of the tubular extension 11 of the axle housing, and forms a dust shield for the brake. The shaft for the brake actuating cam 65 is also supported by the dust shield. The tubular axle extension 11 has a flaring conical wall connecting the split portion which supports the bearing cup 20 with the dust shield 63. Around the larger end of the flaring conical wall, where it joins the dust shield, is a flat annular portion forming an inner end face for the extension 11. This face contacts flatwise with the outer face of an annular circumferential flange 66 on the end of the axle housing, and is securely riveted or welded thereto. Lugs or projections 67 on the flat face of the axle extension 11 position the flange 66 concentrically with respect to the axle extension. The outer end of the axle housing 10 is flared outward in the form of a cone 68 to meet the flange 66. The wall of the cone runs down on the sides of the square axle housing in the middle of each side, and the corners of the square axle housing run up on the wall of the cone, thereby causing an overlapping of the two portions at their junction and forming a gradual transition from one shape to the other which has no one point which is appreciably weaker than the points on each side of it. This arrangement does not require that any holes be made in the axle housing where it is weak, and so the full cross-sectional area of the steel is available to support the bending and twisting stresses at the weakest points between the driving axle bearings and the spring support.

Among the advantages of the foregoing construction are the following: First, there are fewer parts than in prior constructions embodying hollow axles, the parts can be lighter for the same strength by reason of their form, and they can be easily assembled and removed as need be. Second, the form and arrangement of the parts is such that they can be manufactured with precision and assembled with accuracy. Third, the adjustments are few, they are entirely independent of each other, they are simple and easy to make, and they are provided with positive locks. Fourth, the parts are compactly arranged in such manner as to lessen the moment arms of forces acting in couples to produce bending or twisting, and thereby rigidity and silent operation are promoted.

It is evident that changes in the form, dimensions and arrangements of some of the parts of the axle may be made without sacrificing the objects of the invention, and the invention is not restricted to the forms and arrangements of parts shown in the drawing except as particularized in the appended claims.

What I claim is:

1. A driving axle comprising a casing having its middle enlarged and provided with an opening to receive the driving gear, said casing having hollow extremities at the ends of which the road wheels are journaled, a gear carrier secured to said casing around said opening and having two pedestals for combined radial and thrust bearings projecting through said opening into the casing in longitudinal alinement, a drum journaled in said pedestals, one of said pedestals being solid with said gear carrier and the other being split in an axial plane and provided with a removable cap and a part removable with the cap to permit endwise movement of said drum, equalizing gearing in said drum, a bevel driving gear secured to said drum, a bevel driving pinion journaled in alined bearings in said carrier, substantially at right angles to said drum and meshing with the bevel gear carried thereby, and driving shafts arranged in the hollow extremities of the casing and having at their outer ends operative engagement with the road wheels, the inner ends of said driving shafts being slidable axially through said pedestals into said drum for engagement with said equalizing gearing.

2. A driving axle comprising a unitary axle casing, driving axle sections for driving the road wheels arranged in said casing, a gear carrier secured to one side of said casing, and removable laterally therefrom, said gear carrier having two pedestals projecting into said casing in alinement with said driving axle sections, one of said pedestals being solid with said gear carrier, an equalizing gear drum journaled in said alining pedestals, a bevel driving gear secured to said drum, a bevel driving pinion arranged at right angles to said drum and meshing with the bevel gear carried thereby, said bevel driving pinion being journaled in said gear carrier, whereby said gears are rigidly maintained in relative position and alinement, and said casing being so shaped as to permit endwise movement and rotation of said drum whereby it can be removed.

3. A driving axle comprising a casing, driving axle sections for driving the road wheels arranged in said casing, a gear carrier secured to one side of said casing, said gear carrier having two pedestals projecting into said casing in alinement with said driving axle sections, one of said pedestals being solid with said gear carrier, and a third pedestal integral with said gear carrier and transversely arranged with respect to said two alining pedestals, an equalizing gear drum journaled in said alining pedestals, the journal bearings in said pedestals being arranged to permit said drum to be swung out of alinement with said pedestals and withdrawn from said casing, a bevel driving gear secured to said equalizing drum next to said solid pedestal, a bevel driving pinion arranged at right angles to said drum and meshing with the bevel gear carried thereby, said bevel driving pinion being journaled at its end adjacent to said drum in said transverse pedestal of said gear carrier, whereby said gears are rigidly maintained in relative position and alinement.

4. A driving axle comprising a casing having its middle enlarged and provided with an opening to receive the driving gear, said casing having hollow extremities at the ends of which the road wheels are journaled, a gear carrier secured to said casing around said opening and having two pedestals for combined radial and thrust bearings projecting through said opening into the casing in longitudinal alinement, one of said pedestals being solid with said gear carrier and the other being split in an axial plane and provided with a removable cap, a drum having hubs journaled in combined radial and thrust bearings in said pedestals, the bearing at one end of said drum being adjustable lengthwise on its hub to take up wear in both bearings, and a washer between the outer end of one bearing and the split pedestal to take thrust on said bearing, and driving shafts arranged in the hollow extremities of the casing and having at their outer ends operative engagement with the road wheels, the inner ends of said driving shafts being slidable axially through said pedestals into said drum for engagement with said equalizing gear, whereby when said driving shafts are withdrawn from said pedestals said cap and washer may be removed and said drum be dismounted.

5. A driving axle comprising a casing having its middle enlarged and provided with an opening to receive the driving gear, a gear carrier secured to said casing and having two pedestals for bearings projecting through said opening into the casing in longitudinal alinement, one of said pedestals being solid with said gear carrier and the other being split in an axial plane and provided with a removable cap, a drum having hubs journaled in bearings in said pedestals, and a washer between the outer end of one bearing and the split pedestal to position said bearing, and driving shafts arranged in the hollow extremities of the casing, the inner ends of said driving shafts being slidable axially through said pedestals into said drum for engagement with said equalizing gear, whereby when said driving shafts are withdrawn from said pedestals said cap and washer may be removed and said drum dismounted.

Signed at Detroit, Mich., this 2nd day of February, 1915.

HERBERT W. ALDEN.

Witnesses:
 F. W. NORTHOVER,
 LESLIE WILLIAMS.